United States Patent [19]

Ezawa et al.

[11] Patent Number: 5,130,632
[45] Date of Patent: Jul. 14, 1992

[54] MANIPULATOR AND CONTROL METHOD THEREFOR

[75] Inventors: Naoya Ezawa; Shinichi Takarada, both of Yokohama, Japan

[73] Assignee: Hitachi, Ltd., Tokyo, Japan

[21] Appl. No.: 622,633

[22] Filed: Dec. 5, 1990

[30] Foreign Application Priority Data

Dec. 6, 1989 [JP] Japan .................. 1-315338

[51] Int. Cl.$^5$ .............................................. G05B 19/40
[52] U.S. Cl. .................... 318/568.11; 318/568.16; 318/628; 318/632; 901/3; 901/9; 901/15; 395/1
[58] Field of Search ............... 318/560-636; 364/513; 901/2, 3, 6, 9, 12, 13, 15-23

[56] References Cited

U.S. PATENT DOCUMENTS

| | | | |
|---|---|---|---|
| 4,193,115 | 3/1980 | Albus | 364/300 |
| 4,278,920 | 7/1981 | Ruoff, Jr. | 318/628 X |
| 4,305,028 | 12/1981 | Kostas et al. | 318/565 |
| 4,530,062 | 7/1985 | Inaba et al. | 318/632 X |
| 4,535,405 | 8/1985 | Hill et al. | 318/685 X |
| 4,603,284 | 7/1986 | Perzley | 318/632 X |
| 4,621,332 | 11/1986 | Sugimoto et al. | 364/513 |
| 4,661,032 | 4/1987 | Arai | 318/568 |
| 4,864,206 | 9/1989 | Onaga et al. | 318/568.11 |
| 4,865,514 | 9/1989 | Tsuchihashi et al. | |
| 4,906,907 | 3/1990 | Tsuchihashi et al. | 318/568.22 |
| 4,928,047 | 5/1990 | Arai et al. | 318/568.16 |
| 4,974,210 | 11/1990 | Lee | 364/513 |

OTHER PUBLICATIONS

"The Manipulator System Controlled Adapted to the Motion of Distal-end Parts of Spacecraft", Fourth Lecture on Space Station, Apr. 28, 1988, pp. 121-122.
Proceeding of the 16th International Symposium on Space Technology and Science, 1988, pp. 1655-1660.

*Primary Examiner*—Paul Ip
*Attorney, Agent, or Firm*—Fay, Sharpe, Beall, Fagan, Minnich & McKee

[57] ABSTRACT

A manipulator, having six degrees of freedom of movement and having a force sensor mounted thereto, is controlled by computing forces and moments applied to the regions of the manipulator from the output of the force sensor. When a force and/or a moment in excess of an allowable load and an allowable load moment of the regions is applied to any region, the joint subjected to the largest load is stopped to save energy consumption of the manipulator. Alternatively by driving the joint in the direction of lessening the load and the load moment, forces and/or moments are prevented from being applied to the regions of the manipulator. Therefore, optimum design is made possible with regard to the strength of the regions of the manipulator and reductions in size and weight of the manipulator can be achieved.

18 Claims, 10 Drawing Sheets

MANIPULATOR AND CONTROL METHOD THEREFOR

BACKGROUND OF THE INVENTION

This invention relates to a manipulator and its control method, and more particularly to a manipulator and its control method used for manipulators having force sensors, operating in space.

As disclosed in "The Space Manipulator System Controlled with Terminal Motion Corresponding Control Scheme" presented at the Fourth Symposium on Space Station (Apr. 28, 1988), the prior-art control method of the manipulator is by use of a force sensor mounted to the tip of the slave arm having six degrees of freedom of movement in a manipulator system comprising a master arm and a slave arm, to detect a load applied to the manipulator and to feed back the detected load to the master arm, thereby conveying the feeling about the magnitude of the force to the operator.

The above-mentioned prior art system has a problem of low work efficiency because when an overload is detected by the force sensor, the operation of the manipulator has to be brought to a complete stop. Since no means is available for lessening a detected overload, which is applied to the structural members, such as the arm and the joint mechanism of the manipulator, the structural members have had to be so constructed as to have a sufficient safety factor of strength in order to secure a required service life. This has been an obstacle to achieving reductions in size and weight of the manipulator. The speed reducers provided at joints of the manipulator have a function to decelerate the output from the motor to produce a torque required to drive the joints. When the speed reducer is accelerated from the output side, it is necessary to limit the load to a smaller amount than that during its deceleration. If the manipulator is formed with a sufficient safety factor of strength, this places constraints on the attempts to make smaller and lighter joints for use with the manipulator.

SUMMARY OF THE INVENTION

An object of this invention is to make it possible to improve the work efficiency so as to accomplish the work without stopping the manipulator even if a load exceeding a certain value is applied to the structural members of the manipulator by enabling control to remove or lessen the applied load by use of the outputs of force sensors of the manipulator.

Another object of this invention is to make it possible to produce a manipulator that is reduced in size and weight by enabling optimum design with regard to the strength of the members of the manipulator by active control of the load applied to the structural members and by imparting optimum strength to the arm and the joints, including speed reducers, of the manipulator.

To achieve the above objects, a control method is provided according to this invention for controlling a manipulator having at least two degrees of freedom of movement and having a force sensor, provided at least in one place of the region located between the base and the tip of the manipulator, wherein the manipulator is controlled by use of a computing method for computing forces and/or moments acting on any given point of the manipulator from the output of at least one force sensor.

Another control method of the manipulator according to this invention is for controlling a manipulator having at least two degrees of freedom of movement and having a force sensor provided at least in one place of the region and located between the base to the tip of the manipulator, wherein forces and/or moments acting on the regions of the manipulator are detected by use of a computing method for computing a force and/or a moment acting on any given point of the manipulator from the output of at least one force sensor, and forces and moments exceeding the allowable load and the allowable moment of the regions of the manipulator are restrained from being applied to the manipulator.

A manipulator according to this invention comprises, a force sensor, computing means for computing a force and/or a moment applied to any given point of the manipulator, and control means for controlling the manipulator, wherein forces and/or moments applied to the regions of the manipulator are computed by the computing means, and the control means controls the manipulator so that a force and/or a moment exceeding the allowable load is restrained from being applied to the manipulator.

In the above-mentioned manipulator control method, forces and moments applied to the parts of the manipulator, the strength of which needs to be monitored, are computed by performing coordinate transformation for output of the force sensor mounted to the manipulator, and when the load is compared with an allowable strength value of some of the parts being monitored, if the load amounts to a predetermined rate of the allowable strength, the joints are moved so as to lessen the load on that part. For example, if the part is the first joint, the load acting on the first joint is decreased by reversing the driving direction of the joint, variations in the position and the attitude of the base of the manipulator, caused by reversing the driving direction of the first joint, are subjected to inverse transformation, controlled variables to correct the variations are computed, and using the controlled variables, corrective control is performed by driving the joints other than the first joint. By this control operation, the position and the attitude of the tip of the manipulator can be maintained close to target values.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

An embodiment of this invention will be described with reference to FIGS. 1 to 10.

Figure 1:
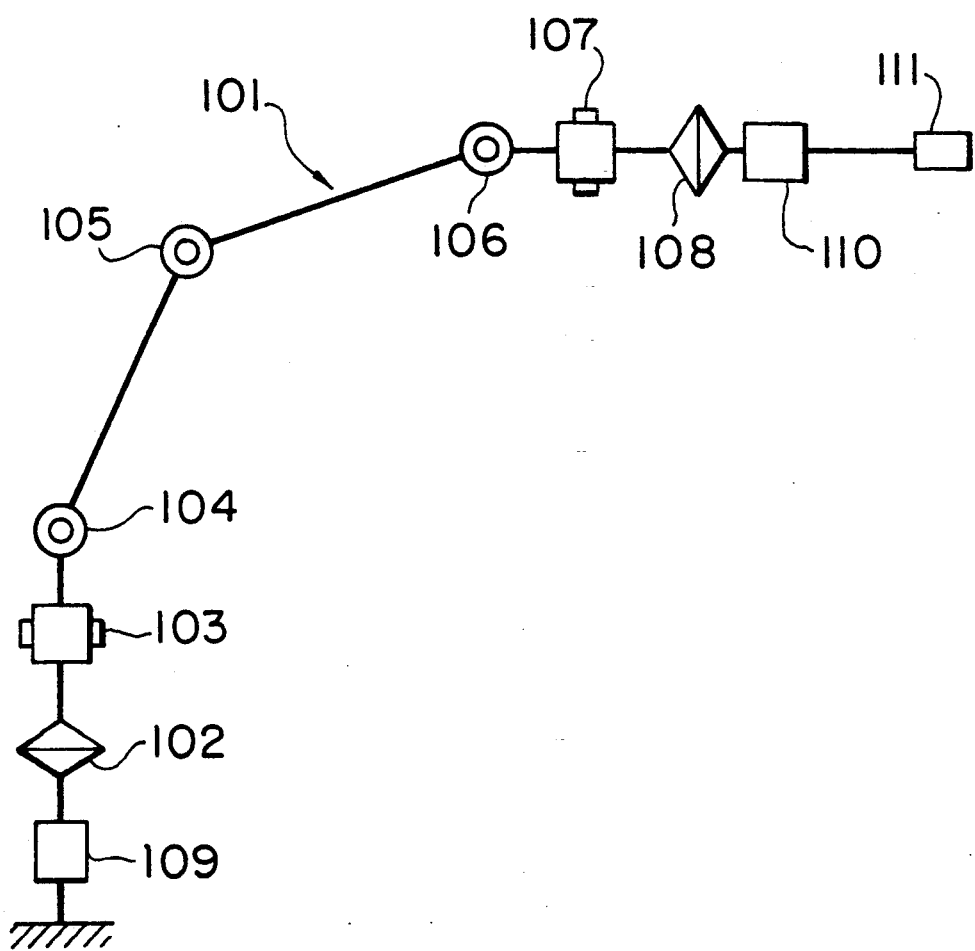
FIG. 1 is a manipulator construction diagram showing an embodiment of a manipulator control method according to this invention.
Figure 2:
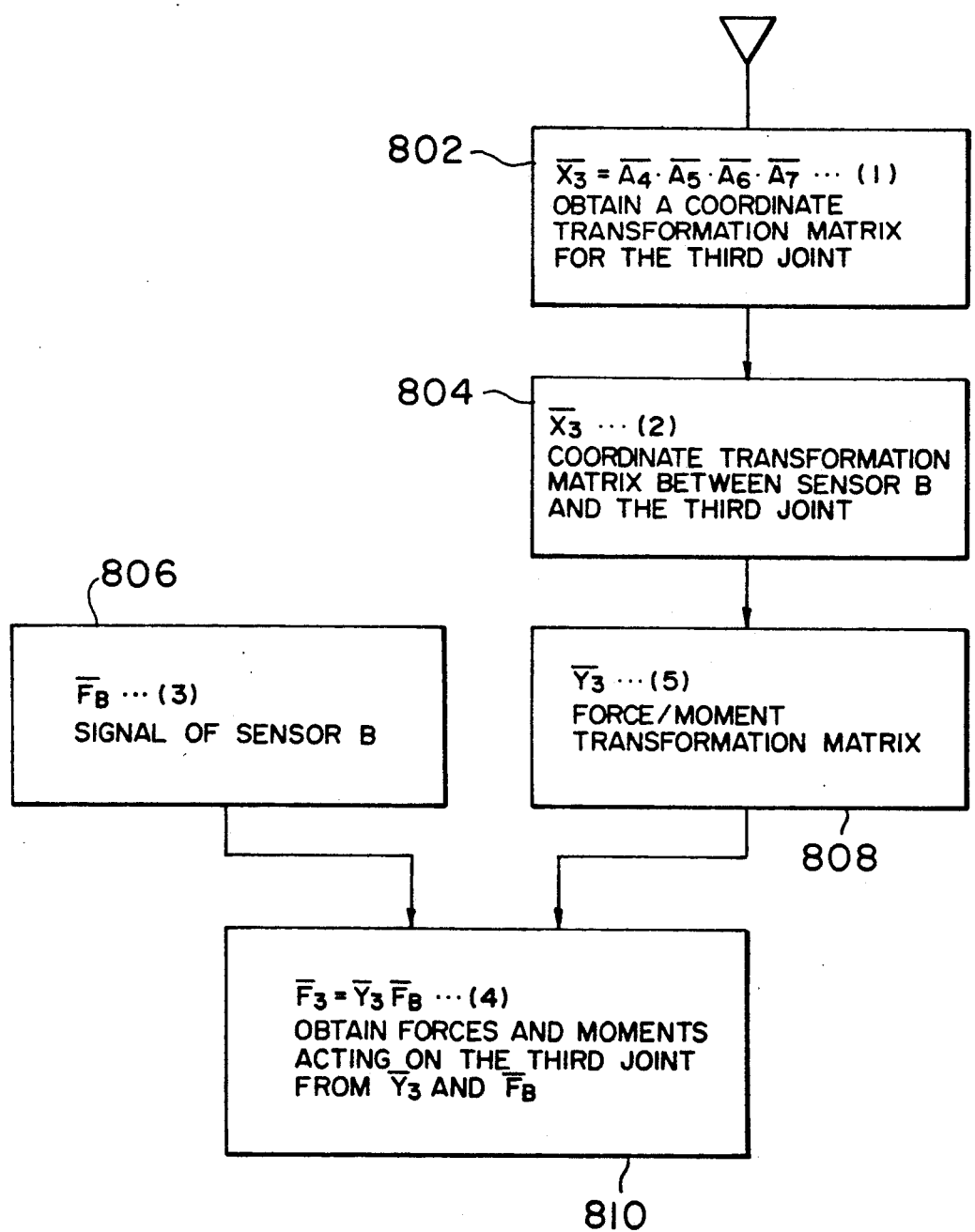
FIG. 2 is a flowchart for computing forces and moments applied to any given point of the manipulator.

FIG. 1 is a construction diagram of a manipulator showing an embodiment of the control method of a manipulator according to this invention. A manipulator 101 comprises seven joints, the first joint 102 to the seventh joint 108, an end effector 111 at the tip, a force sensor A 109 at the base, and a force sensor B 110 at the tip. The sensors A and B detect forces and moments in directions of six degrees of freedom of movement with strain gauges. As an example of a method of computing a force and a moment exerted to any given point of the manipulator, description will now be made of a process of computing forces and moments applied to the third joint 104 from output of the force sensor B 110 by referring to the flowchart of FIG. 2. Let a coordinate transformation matrix for the first joint 102 to the seventh joints 108 of the manipulator 101 be expressed by $A_1 \ldots A_7$. The matrix $\overline{A}_1 \ldots \overline{A}_7$ is a 4 by 4 matrix. A coordinate transformation matrix $\overline{X}_3$ by which to express the coordinate system of the force sensor B 110 by the coordinate system of the third joint 104 is obtained by the following equation (Step 802).

$$X_3 = \overline{A}_4 \cdot \overline{A}_5 \cdot \overline{A}_6 \cdot \overline{A}_7 \tag{1}$$

The elements of $\overline{X}_3$ are represented as follows (Step 804).

$$X_3 = \begin{pmatrix} n_{3x} & o_{3x} & a_{3x} & p_{3x} \\ n_{3y} & o_{3y} & a_{3y} & p_{3y} \\ n_{3z} & o_{3z} & a_{3z} & p_{3z} \\ 0 & 0 & 0 & 1 \end{pmatrix} \tag{2}$$

A vector $\overline{F}_B$ of forces and moments, detected by the force sensor B 110, is expressed by a 6-dimensional vector as shown below (Step 806).

$$F_B = \begin{pmatrix} f_x \\ f_y \\ f_z \\ m_x \\ m_y \\ m_z \end{pmatrix}$$

A vector $\overline{F}_3$ of forces and moments, applied to the third joint 104 (Step 810), is obtained by the following equation.

$$F_3 = (f_{3x}, f_{3y}, f_{3z}, m_{3x}, m_{3y}, m_{3z})^T = \overline{Y}_3 F_B \tag{4}$$

A force/moment transformation matrix $\overline{Y}_3$ is expressed as (Step 808):

$$Y_3 = \begin{pmatrix} n_{3x} & o_{3x} & a_{3x} & 0 & 0 & 0 \\ n_{3y} & o_{3y} & a_{3y} & 0 & 0 & 0 \\ n_{3z} & o_{3z} & a_{3z} & 0 & 0 & 0 \\ (\overline{p}_3 \times \overline{n}_3)_x & (\overline{p}_3 \times \overline{o}_3)_x & (\overline{p}_3 \times \overline{a}_3)_x & n_x & o_x & a_x \\ (\overline{p}_3 \times \overline{n}_3)_y & (\overline{p}_3 \times \overline{o}_3)_y & (\overline{p}_3 \times \overline{a}_3)_y & n_y & o_y & a_y \\ (\overline{p}_3 \times \overline{n}_3)_z & (\overline{p}_3 \times \overline{o}_3)_z & (\overline{p}_3 \times \overline{a}_3)_z & n_z & o_z & a_z \end{pmatrix} \tag{5}$$

where $$\overline{p}_3 = (p_{3x}, p_{3z})^T$$

$$\overline{n}_3 = (n_{3x}, n_{3y}, n_{3z})^T$$

$$\overline{o}_3 = (o_{3x}, o_{3y}, o_{3z})^T$$

$$\overline{a}_3 = (a_{3x}, a_{3y}, a_{3z})^T \tag{6}$$

The $()_x$, $()_y$, and $()_z$ represent x, y and z components respectively.

By using the computing method shown above $\overline{F}_i$ of forces and moments applied to the i-th joint at any given point of the manipulator 101 can be generally obtained from output $\overline{F}_b$ by the following equation:

$$F_i = \overline{Y}_i F_B \tag{7}$$

If a coordinate system of the i-th joint is set such that its axis of rotation is the z axis, the moment acting on the periphery of the i-th joint can be obtained by $m_{iz}$ and a vertical force acting on the i-th joint can be obtained by $\sqrt{f_{ix} + f_{iy}}$. By using this computing method, the manipulator 101 can be controlled.

Description has been made of a case where forces and moments exerted on the third joint are computed. However, by using this computing method, forces and moments can be computed which are applied to any given point of the structural members of the manipulator, including not only the joints but also the arm, etc. To be more specific, if this computing method is used, the structural members can be designed by optimum design by providing the structural members of the manipulator with strength sufficient to withstand anticipated loads and load moments, and by actively controlling the manipulator the imparted strength is not exceeded.

In the manipulator 101 of this embodiment using the force sensor A and the force sensor B, the outputs of the force sensors are calibrated by comparing those outputs. This is done partly because there is a possibility that the force sensors fail and partly because errors of the sensors are anticipated due to a temperature difference of several hundred degree centigrade which will occur as the manipulator used in space is exposed to the rays of the sun at one time and shielded from the sun at another time.

Figure 3:
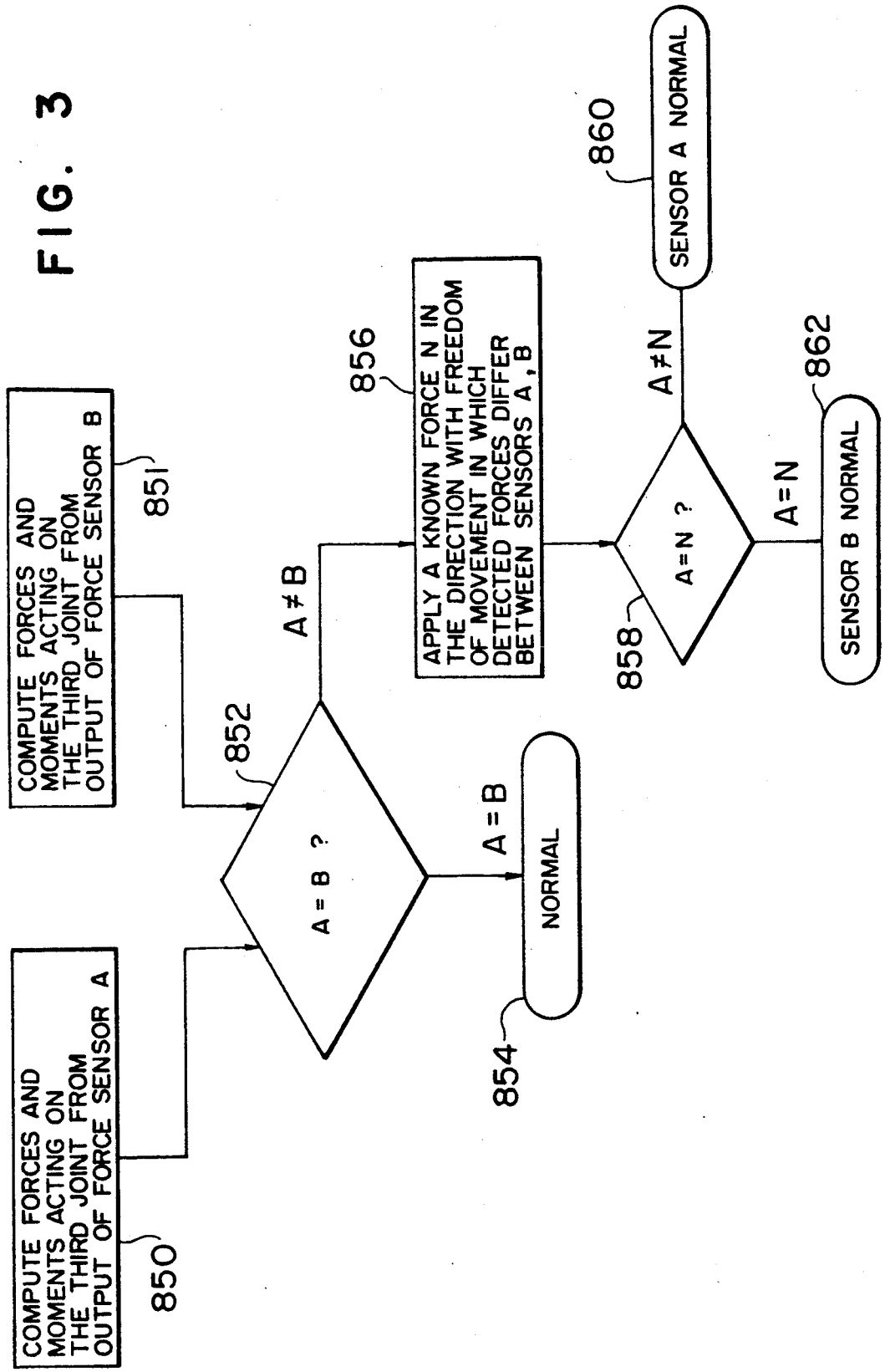
FIG. 3 is a flowchart for comparing outputs of two force sensors.

This calibration method will be described with reference to FIG. 3. As an example, a case is taken in which the forces and moments applied to the third joint 104 are compared.

From the forces and the moments detected by the force sensor A, forces and moments acting on the third joint are computed by the above-mentioned computing method (Step 850). Likewise, from the values detected by the force sensor B, forces and moments acting on the above-mentioned third joint are computed (Step 851). Components of each six-dimensional vector of forces and moments ($f_x$, $f_y$, $f_z$, $m_x$, $m_y$, $m_z$) are compared between the force sensor A and the force sensor B, and if all the values compared are equal, the force sensors A and B are judged normal (Step 854).

If any difference is found to determine which sensor is abnormal, the operation moves on to the next step. For example, if values of $f_y$ differ between the sensors A and B, a test is performed in which a known force N is actually applied in the $f_y$ direction by driving the manipulator (Step 856). A decision is made whether or not the value of $f_y$ provided by the sensor A is N (Decision Step 858). When the value of $f_y$ is not equal to N, a decision is made that the sensor A is abnormal (Step 860). When the $f_y$ is equal to N, a decision is made that the sensor B is abnormal (862).

Description was made of a case wherein which of the sensors A and B is abnormal is decided. However, when outputs from the sensors A and B are not equal, nothing other than notification of the abnormality to the operator may be done by activating an alarm.

A method for controlling the manipulator 101 with least energy consumption will next be described referring to FIG. 4.

Figure 4:
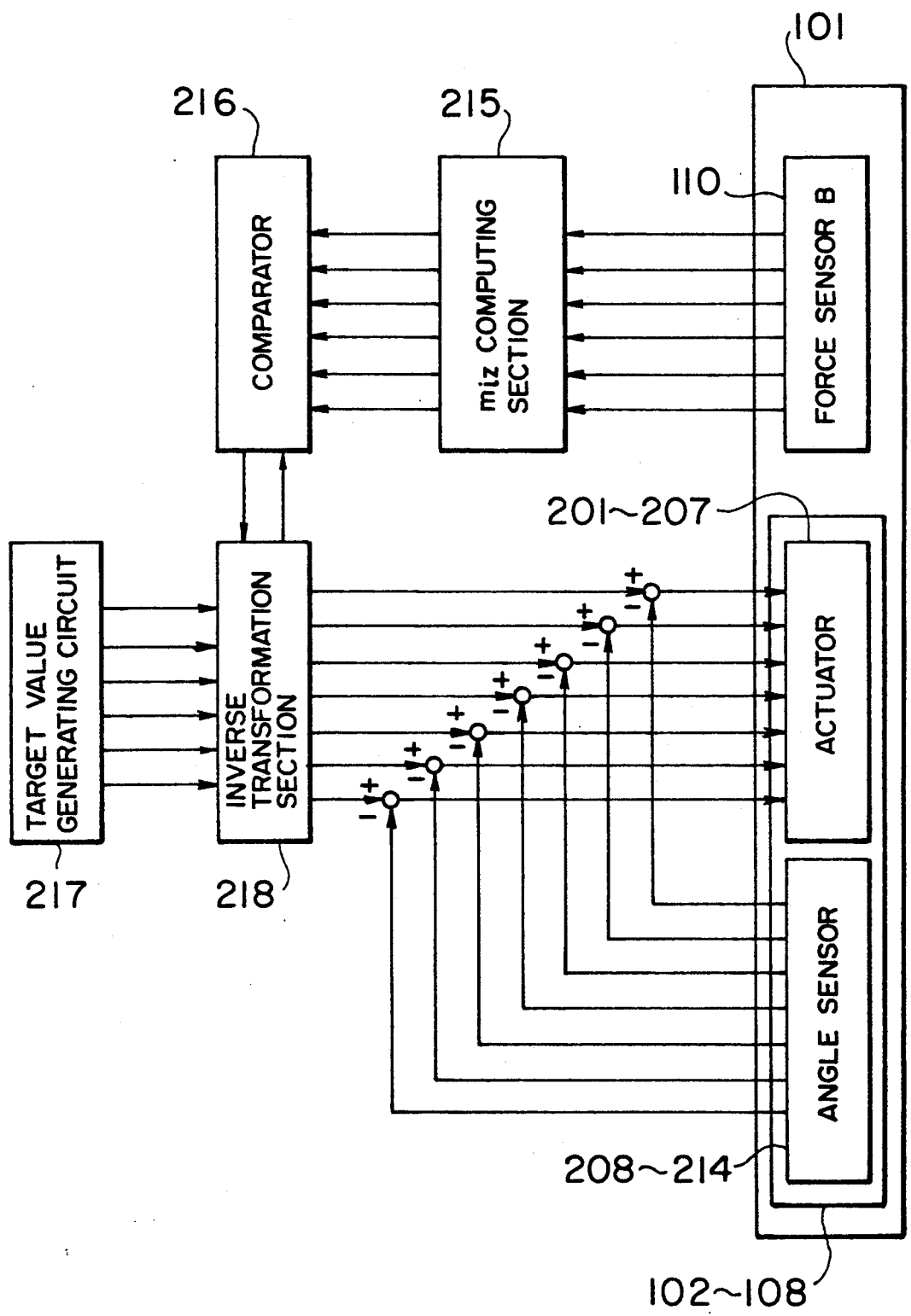
FIG. 4 is a control block diagram of a control method for saving energy consumption of FIG. 1.

FIG. 4 is a block diagram showing an embodiment of the control method according to this invention for curtailing the energy consumption of the manipulator of FIG. 1. The first to seventh joints 102 to 108 of the manipulator 101 comprise actuators 201 to 207 and angle sensors 208 to 214. Next, the flow of signals will be described in sequential order. Forces and moments acting on the tip of the manipulator ar detected by the force sensor B 110. From the forces and moments, the $\overline{F}_B$ of moments $M_{1z}$ to $m_{7z}$ acting on the peripheries of the first to seventh joints 102 to 108 are obtained by the moment $m_{iz}$ computing section 215 by using the equation (7). To be more specific, moments $m_{1z}$ to $m_{7z}$ (scalar quantities) applied in the rotating direction of each joint are obtained.

On receiving signals of the seven moments $m_{1z}$ to $m_{7z}$, a comparator 216 finds a joint which requires the greatest power in the direction in which the first to the seventh joints 102 to 108 are going to move, and delivers the number of that joint to an inverse transformation section 218. On receipt of target values of the position and the attitude of the tip of the manipulator 101 from a target value generating circuit 217, the inverse transformation section 218 performs inverse transformation for the six joints other than the joint whose number was delivered from the comparator 216, and outputs command values to the six joints. At this time, a command value for maintaining the current angle is output for the joint number received from the comparator 216. These command values are increased or decreased by differences between the command values and the current values detected by the angle sensors 208 to 214, and are input into the actuators 201 to 207 to drive the actuators.

If this control method is used, the manipulator 101 can be controlled by using the six joints excluding the joint which consumes the greatest amount of energy. In performing the same operation, the power consumption of the manipulator can be reduced by driving the joints under lesser load in preference to the joints under large load. Therefore, when the manipulator is operated on a spacecraft with a limited energy source, such as an orbital servicing vehicle, the mounted battery can be minimized. Even if a battery with the same capacity is used, the battery can be used for a longer period of time, so that the work efficiency is improved.

Figure 5:
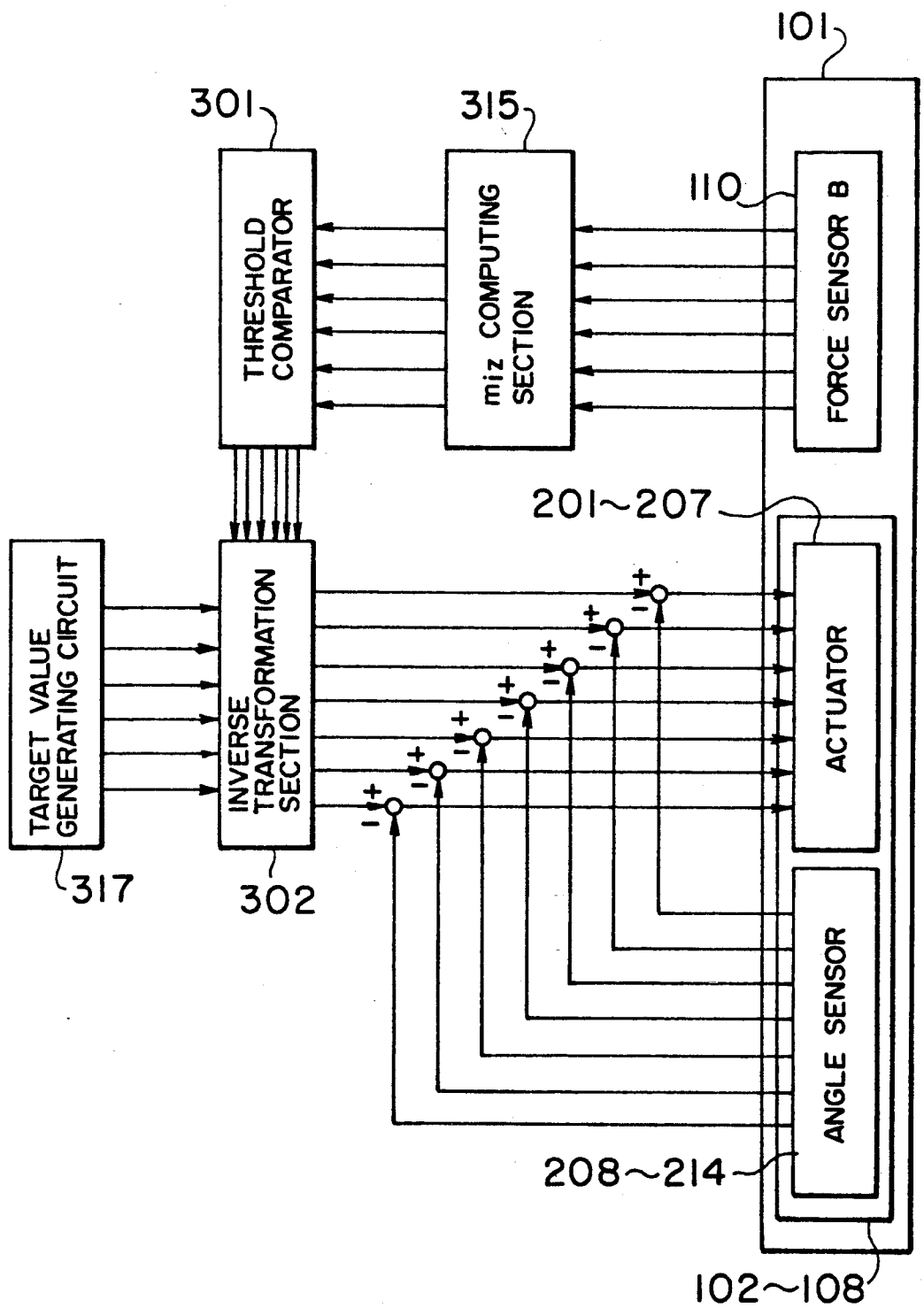
FIG. 5 is a control block diagram of a control method for reducing the load moment of each joint of FIG. 1.

With reference to FIG. 5, description will be made of a control method for changing the attitude of the manipulator in order to protect a joint at which a moment has exceeded the threshold of the joint of the manipulator.

FIG. 5 is a control block diagram showing an embodiment of the control method for reducing load moments applied to the joints of the manipulator of FIG. 1. In this control method, a computing section 315 and a target value generating circuit 317 are used which are almost identical with those of FIG. 4, but a threshold value comparator 301 and an inverse transformation section 302 are not identical with their counterparts in FIG. 4. So, only those different parts will be described.

Moments $m_{1z}$ to $m_{7z}$ acting on the peripheries of the first to the seventh joints 102 to 108, obtained by a moment $m_{iz}$ computing section 315 are sent to a threshold comparator 301. The threshold comparator 301 compares the moments $m_{1z}$ to $m_{7z}$ acting on the joint peripheries with the thresholds for the joints, and transmits to the inverse transformer 302 the degrees of excess regarding the joints at which the moments are exceeding the thresholds. To a joint exceeding the threshold, the inverse transformation section 302 issues a command value to move the joint in the direction of reducing the moment acting on the periphery of the joint in accordance with the degree of excess, and for the other joints, the inverse transformation section 302 performs inverse transformation according to target values from the target value generating circuit 317, and issues command values.

Variations in the position and the attitude of the tip of the manipulator, which are caused by reversing the movements of the joints, are subjected to inverse transformation, and controlled variables are computed to correct those variations. Corrective control is performed by driving the joints other than the first joint by the thus-obtained controlled variables in order to maintain the position and the attitude of the tip of the manipulator. In this process, if zero or one joint exceeds the threshold, all the target values can be satisfied. If more than one joint exceeds the threshold, either the position or the attitude of the tip of the manipulator 101 is sacrificed.

According to this control method, when a moment acting on some joint of the manipulator exceeds its threshold, in order to protect the joint exceeding the threshold, the attitude of the manipulator is changed, so that the load on the joint can be reduced.

When a load in excess of a certain value is applied to the manipulator, if the attitude of the manipulator is changed by reversing the motion of the joint under large load, it is not necessary to stop the motion of the manipulator. This contributes to an improvement in the work efficiency. In this example, thresholds are set for the individual joints. However, if forces and moments are detected at various regions, in addition to the joints, of the manipulator, when the load on some region is found to be approaching the limit value, it is possible to adequately drive the joint in the direction of reducing the load on the region.

Figure 6:
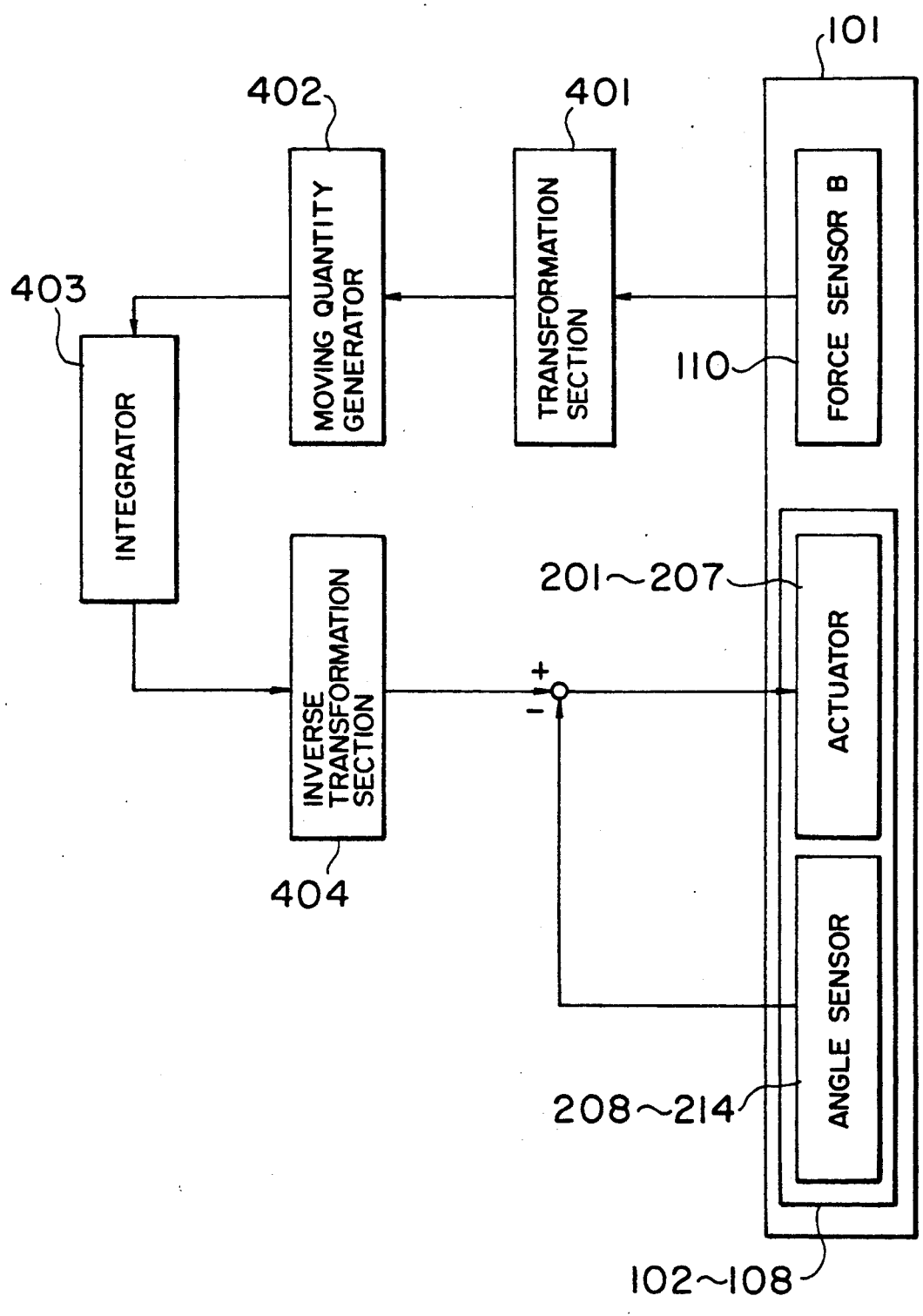
FIG. 6 is a control block diagram of a control method for lightening the load when the tip of the manipulator of FIG. 1 is constrained.

With reference to FIG. 6, description will be made of a control method for reducing the force when the tip of the manipulator 101 is constrained and subjected to forces.

Figure 9:
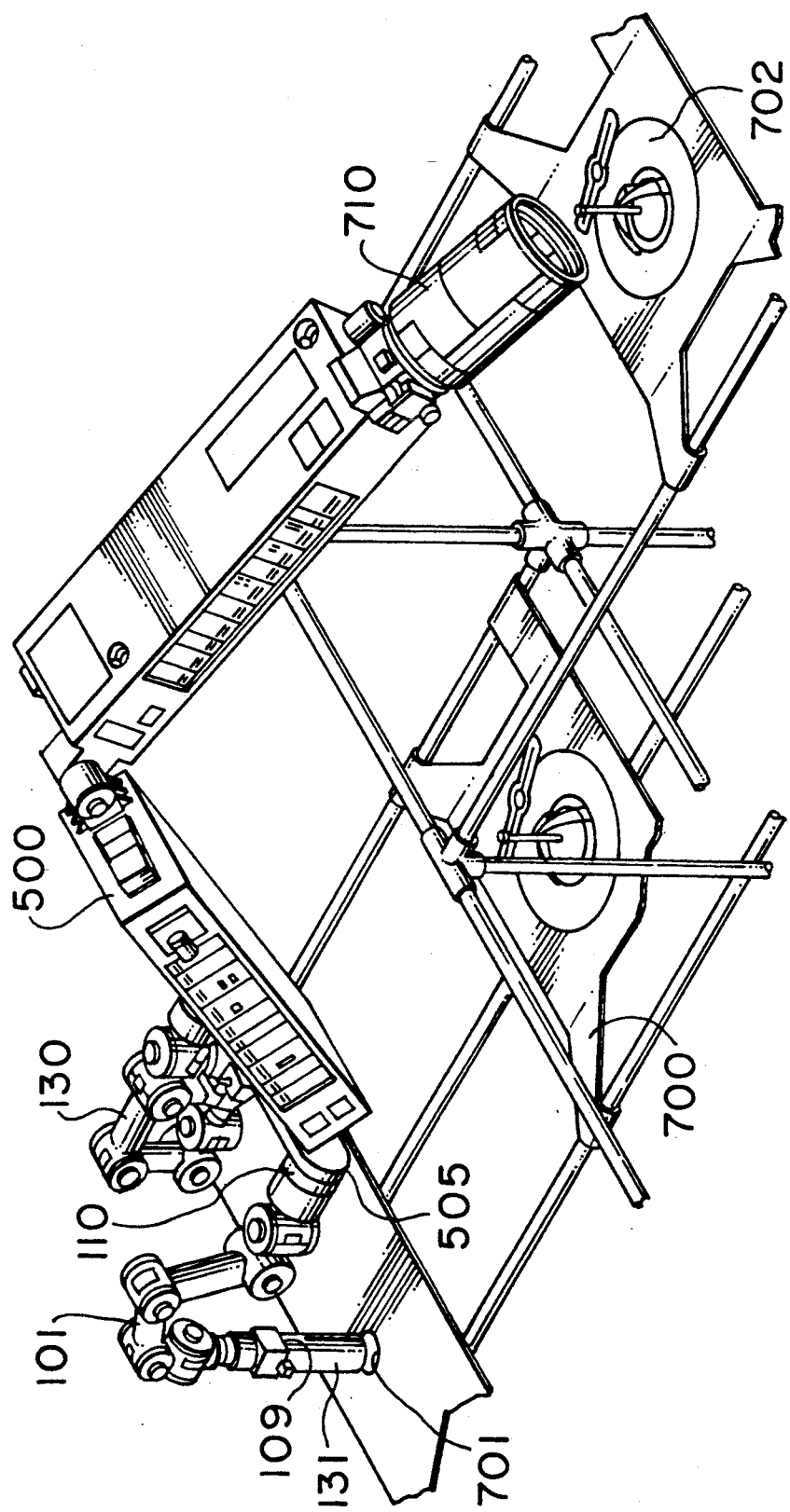
FIG. 9 is an external view of work under way.

When a orbital servicing vehicle (robot) moves on the truss in an inch-worm motion as shown in FIG. 9, and end effectors (2) 131 and (3) 710 are constrained as they hold the fixtures on the truss, if the angles of the joints deviate even slightly from the correct values, stresses are set up inside the joints. In this case, it is desirable to move the joints in such a way as to alleviate the stresses.

Assuming such a situation, FIG. 6 presents a block diagram showing an embodiment of a control method for reducing the load when the tip of the manipulator 101 is constrained. In FIG. 6, for the sake of simplicity, the paths of six- or seven-dimensional signals are indicated collectively by a single arrow mark. Forces and moments exerted on the tip of the manipulator 101 are detected by the force sensor B110. Accordingly, the positive transformation section 401 receives the forces and moments expressed by the reference coordinate system. The forces and moments are given by the equations (1) to (7). The forces and moments are represented as $\bar{F}_N$. According to the $\bar{F}_N$ of forces and moments, the moving quantity generator 402 obtains the quantity of movement for the tip of the manipulator 101 as follows.

$$\text{If } F_N = (f_{Nx}, f_{Ny}, f_{Nz}, m_{Nx}, m_{Ny}, m_{Nz})^T \quad (8)$$

$$x\text{-direction moving quantity} = K_1 f_{Nx}$$

$$y\text{-direction moving quantity} = K_1 f_{Ny}$$

$$z\text{-direction moving quantity} = K_1 f_{Nz} \quad (9)$$

$$\text{Roll angle variation} = K_2 m_{Nx}$$

$$\text{Pitch angle variation} = K_2 m_{Ny}$$

$$\text{Yaw angle variation} = K_2 m_{Nz}$$

where $K_1$ and $K_2$ are constants. These moving quantities and variations are integrated by an integrator 403, which delivers to the inverse transformation section 404 integration results as target values for the position and the attitude of the tip of the manipulator 101. The inverse transformation section 404 performs inverse coordinate transformation according to the target values, and obtains command values for the first to seventh joints 102 to 108. The command values are increased or decreased by differences between the command values and the current values of angles detected by the angle sensors 208 to 214 and are inputted into the actuators 201 to 207 to drive the actuators.

According to this control method, when the tip of the manipulator 101 is constrained and subjected to a great force, it is possible to change the attitude of the manipulator 101 so as to alleviate the force exerted thereto.

Other applications of this control method will be described.

In the control method described with reference to FIG. 9, description was made of a case in which the end effectors are holding two stationary points, stresses are induced in the joints and the control method is used to reduce the stresses. In addition, description will be made of a case in which this control method is used to alleviate the stresses in the joints, which are induced when an end effector captures a floating object flying at a relative speed in relation to the manipulator.

Figure 10:
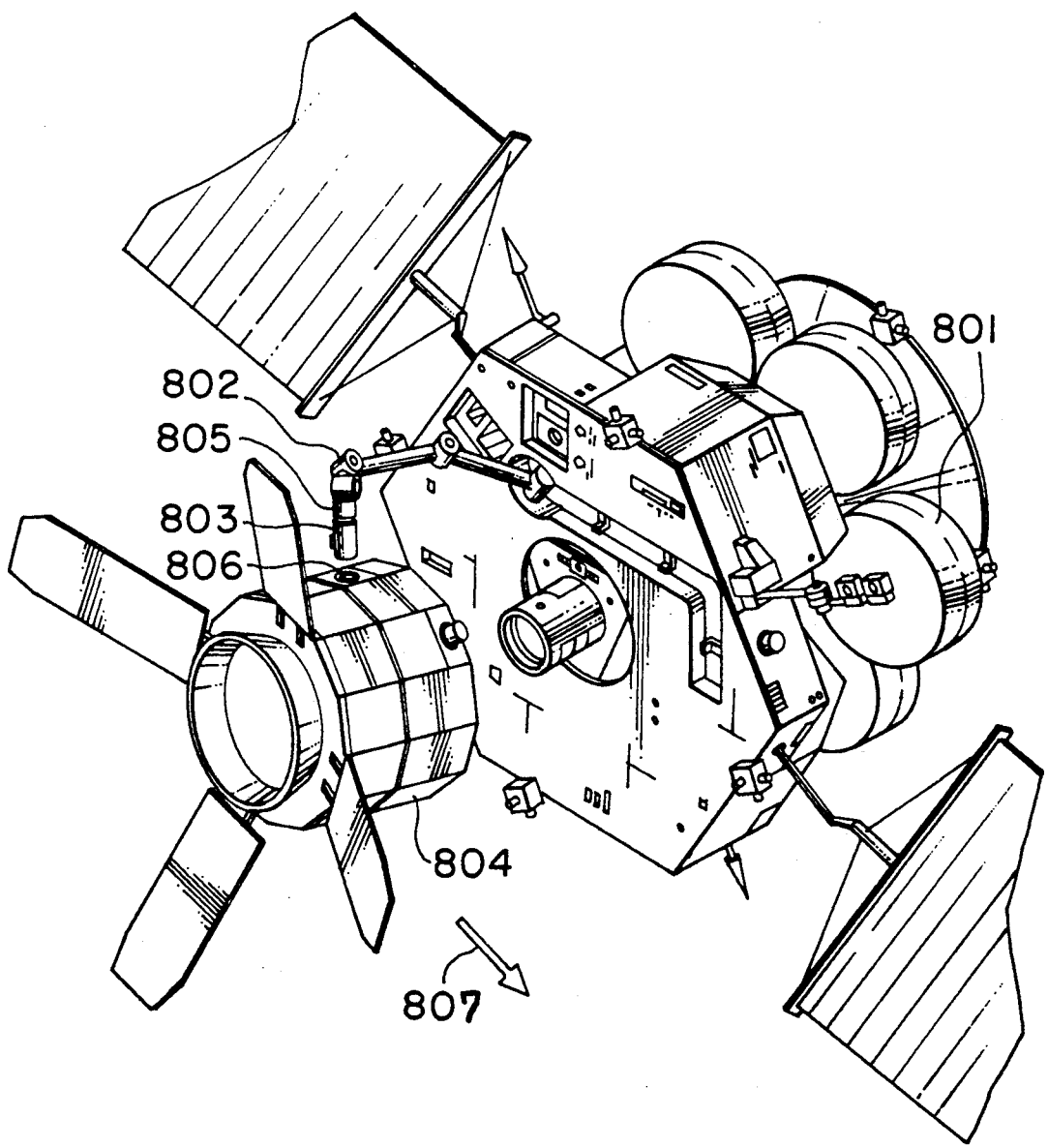
FIG. 10 is an external view of a space robot in the process of grasping a floating object.

Suppose that a space robot 801, shown in FIG. 10, is going to capture a floating object 804 moving relative to the space robot in the direction indicated by an arrow mark 807 with an end effector 803 at the tip of the manipulator 802. When the manipulator is capturing of the floating object, if the manipulator is fixed while the manipulator is controlled by a conventional control method, the instant the end effector 803 catches the floating object 804, the momentum resulting from a difference in the relative speed between them is applied to the manipulator instantly, and the manipulator is subjected to a great stress. However, according to this embodiment of this invention, the manipulator is so structured that when the end effector 803 catches the floating object, the end effector 803 resists (slowing down the speed) the moving direction of the floating object 804 but the manipulator does not fix itself, and thus releases the above-mentioned great stress. Specifically, the manipulator does not render the floating object stationary (reduce the relative speed to zero) in relation to the manipulator, but resists to eliminate the relative speed while changing its attitude.

The control method according to this embodiment is carried that out so, at the moment the end effector 803 catches the floating object, the control method described with reference to FIG. 6 is implemented, forces and moments exerted on the tip of the manipulator 802 are detected by a force sensor 805, and according to the detected values, the moving quantity for the tip of the manipulator 802 is determined by the equations (1) to (9), and the manipulator changes its attitude without fixing itself while resisting the floating object. By changing the attitude in this way, the manipulator slows down the speed of the floating object while limiting the forces and moments, exerted by the floating object on any given regions of the manipulator, within the allowable strength range of the manipulator.

The above-mentioned resisting forces are represented by $K_1$ and $K_2$. By manipulating these values, the braking distance can be varied to make the floating body 804 have the same characteristic speed as that of the space robot 801. Since the operation limit (range) in which the manipulator can move is determined in design, in this embodiment the $K_1$ and $K_2$ are set so that the braking distance is very close to the operation limit, thereby limiting the stresses that act on the manipulator.

Figure 7:
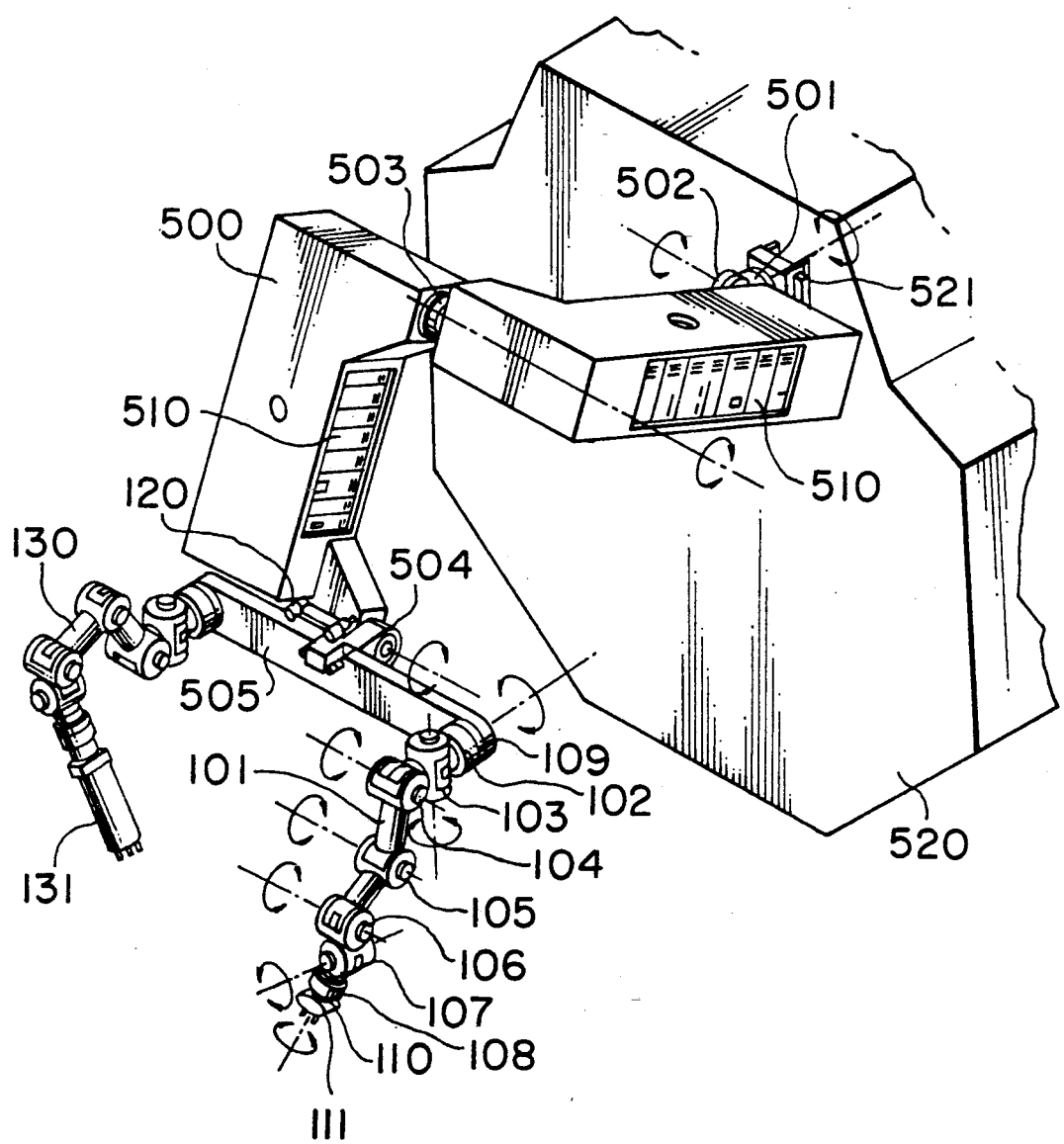
FIG. 7 is an external view of an example in which this invention is applied to an orbital servicing vehicle of FIG. 1.

With reference to FIG. 7, description will be made of an application of the control method of the manipulator to an orbital servicing vehicle.

FIG. 7 is an external view of the application of the control method of the manipulator 101 of FIG. 1 to an orbital servicing vehicle. This servicing vehicle to be placed in orbit in space comprises an extending arm 500, an adapter 505, a manipulator (1) 101, and a manipulator (2) 130. This extending arm 500 is mounted to the servicing vehicle body 520 with the intermediary of a base 521. Two manipulators (1) 101 and (2) 130 are attached to the tip of the extending arm 500 with the intermediary of an adapter 505. By using the first to the fourth joints 501 to 504, this extending arm moves the manipulators (1) 101, (2) 130 at the tip thereof to a position most suitable for the work and supports the manipulators. The arm section of the extending arm 500 has mounted therein an electronic section which includes a power source and a control unit of the manipulators (1) 101, (2) 130. An end effector (2) 131 is provided at the tip of the manipulator (2) 130 and a stereo camera 120 is mounted to the adapter 505.

Figure 8:
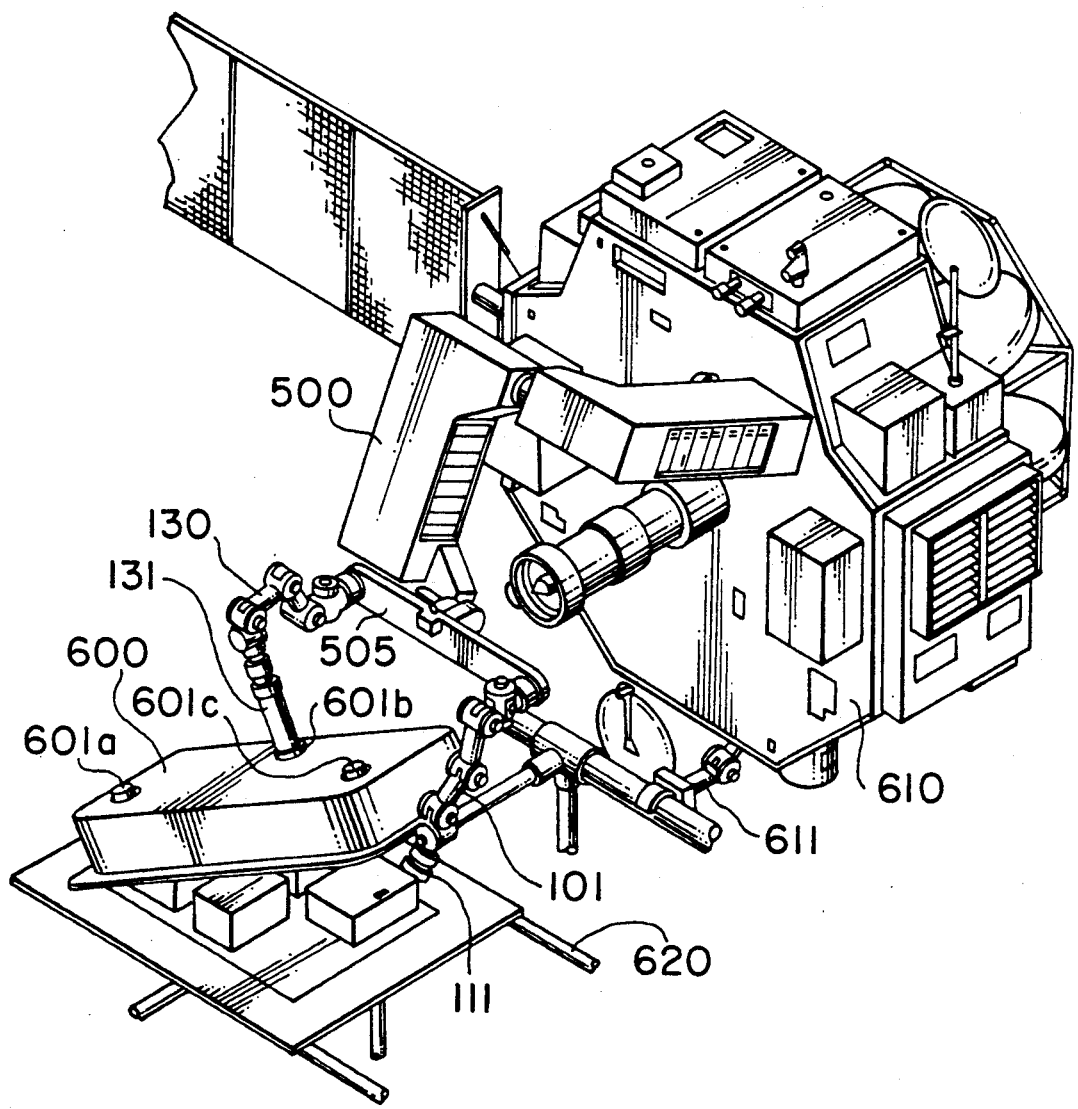
FIG. 8 is an external view of work being done by the orbiting vehicle of FIG. 7.

Referring to FIG. 8, an example of work by this orbital servicing vehicle is shown. In this orbital servicing vehicle, the control method described with reference to FIG. 5 is used for control of the manipulators. FIG. 8 is an external view of an example of work by the orbital servicing vehicle. This orbiting work vehicle 610 fixes itself to an exposed working platform 620 with an anchor arm 611. The manipulator (2) 130, mounted to the servicing vehicle 610 with the intermediary of the extending arm 500 and the adapter 505, holds a fixture (1) 601a of a payload 600 with the end effector (2) 131, and performs work to install the payload to the exposed working platform 620.

Since the payload 600 is relatively large, when the manipulators (1) 101, (2) 130 are performing operations such as moving, pushing and supporting, the manipulators (1) 101, (2) 130 are sometimes subjected to an excessive load from an inertial force of the payload 600. In such a case, if an actual load reaches a certain proportion of the allowable load of any of the joints, an excessive load is prevented from being exerted to the joint while a certain function is under way by reversing the driving motion of that joint and covering that joint with the other joints.

With reference to FIG. 9, an example of work by the orbital servicing vehicle will now be described.

FIG. 9 shows an external view of work in which an orbital servicing vehicle having end effectors at the opposite ends thereof moves like an inch-worm. Under the condition that both end effectors are holding the truss and are constrained, this orbital servicing vehicle changes its attitude so as to alleviate the internal stresses by the control method described with reference to FIG. 6.

This orbital servicing vehicle is a compound manipulator system comprising an extending arm 500, an adapter 505, two manipulators (1) 101, (2) 130, an end effector (3) 710 of the extending arm 500, and an end effector (2) 131 of the manipulator 101. The compound manipulator system performs work by moving on the exposed working platform while receiving electric power and signals from the working platform.

In FIG. 9, the manipulator (1) 101 is holding a fixture (2) 701 mounted on an exposed working platform 700 with the end effector (2) 131 attached to the tip of the manipulator, and is supporting the whole compound manipulator system. An end effector (3) 710 attached to the extending arm 500 is prepared to hold a fixture (3) 702 mounted on the exposed working platform 700. When the end effector (3) 710 holds the fixture (3) 702, a load resulting from the holding action is applied to the regions constituting the compound manipulator system. In this case, load control is implemented so that the load applied to the regions of the system does not exceed allowed values by using the force sensors A 109 and B 110 and by changing the attitude of the manipulators to alleviate the load by the above-mentioned method.

Another example of work will be described wit reference to FIG. 10. FIG. 10 is an external view of work in which a space robot 801 which uses the control method described referring to FIG. 6, captures floating object 804 having a relative speed in relation to the manipulator with an end effector at the tip of the manipulator.

When the space robot 801 captures a fixture 806 of a floating object 804 moving at a relative speed in relation to the space robot with an end effector 804 at the tip of the manipulator 802, a load caused by the catching action is applied to the regions constituting the manipulator system. In this case, the control method of FIG. 6 is used, under which while the manipulator is resisting (slowing down the speed) the moving direction of the floating object, according to the output of a force sensor 805 mounted to the manipulator, the manipulator changes its attitude so as to prevent the load applied to the regions of the manipulator from exceeding allowable values and makes the floating object stationary (move at the same characteristic speed) in relation to the manipulator within the limits within which the manipulator can move by its mechanism.

In the foregoing embodiments of this invention, description has been made of manipulators used in space. However, the manipulator of this invention can be used not only in space but also in environments which are impossible to gain access to, such as the deep sea and a nuclear reactor, and can be applied suitably to robots in general and extensive use, including industrial robots.

While particular embodiments of the present invention have been shown and described, it will be obvious to those skilled in the art that various changes and modifications may be made without departing from the present invention in its broader aspects.

What is claimed is:

1. A manipulator control method for use with a manipulator having a plurality of joints providing at least two degrees of freedom of movement and having a force/torque sensor provided at least in one place of a region located between a base and a means for mounting an end effector of the manipulator, comprising the steps of:
   computing a force/torque applied to any given point, including joints, of the manipulator from the output of at least one force/torque sensor; and
   detecting the force/torque applied to the joints of the manipulator by using said computing step, finding a joint subjected to the largest force/torque, stopping the drive of said joint, and driving the other joints to perform a specified motion.

2. In a manipulator system, including a manipulator having a base, means for mounting an end effector remote from said base, and a plurality of joints operably disposed between said base and said means for mounting the end effector for achieving multiple degrees of freedom of operation for the manipulator, the improvement comprising:
   a force/torque sensor, disposed between said base and said means for mounting the end effector, for detecting the force/torque acting on the manipulator and for providing an output representative of said force/torque;
   computing means for computing the force/torque acting on any given point of the manipulator from the output of said force/torque sensor; and
   control means for controlling the manipulator so as to counteract the force/torque, acting on the manipulator, that exceeds a predetermined level, in a region including the point of the manipulator upon which the force/torque is acting.

3. A manipulator as claimed in claim 2, wherein said control means includes means for discontinuing motive power to a joint that is subjected to the force/torque that exceeds a predetermined level, while maintaining motive power to joints that are not subjected to such said force/torque.

4. A manipulator as claimed in claim 2, wherein said control means includes means for driving a joint in the direction of the moment of the force/torque, acting on the joint, that exceeds a predetermined level, while maintaining motive power to joints that are not subjected to such a force/torque.

5. A manipulator as claimed in claim 2, wherein said control means includes means, responsive to a signal from said computing means, for changing the attitude of the manipulator so as to reduce the force/torque acting on said means for mounting the end effector.

6. A manipulator as claimed in claim 2, wherein said control means includes means, responsive to a signal from said computing means representing the force/torque acting on said means for mounting the end effector due to an object impacting on the end effector mounted thereon, for changing the attitude of the manipulator in a direction of reducing a moment of the force/torque acting on said means for mounting the end effector, so that the manipulator reduces the momentum of the object while stresses applied to the manipulator as a result of the impact are reduced to less than a predetermined level.

7. In an orbital servicing vehicle for carrying out servicing operations in outer space, said orbital servicing vehicle including a manipulator system having a manipulator comprising a base, means for mounting an end effector remote from said base, and a plurality of joints operably disposed between said base and said means for mounting the end effector for achieving multiple degrees of freedom of operation for the manipulator, the improvement comprising:
 a force/torque sensor, disposed between said base and said means for mounting an end effector, for detecting a force/torque acting on the manipulator and for providing an output representative of said force/torque;
 computing means for computing the force/torque acting on any given point of the manipulator from the output of said force/torque sensor; and
 control means for controlling the manipulator so as to counteract the force/torque, acting on the manipulator, that exceeds a predetermined level, in a region including the point of the manipulator upon which the force/torque is acting.

8. A manipulator control method for controlling a manipulator having at least two degrees of freedom of movement, said manipulator including a base, a means for mounting an end effector remote from said base, and a force/torque sensor operably disposed between said base and said means for mounting the end effector, comprising the steps of:
 sensing a force/torque, acting on any given point of the manipulator, with said force/torque sensor;
 outputting a signal from said force/torque sensor representative of the sensed force/torque;
 computing the force/torque from the signal output from said force/torque sensor; and
 controlling the operation of the manipulator in accordance with the computed force/torque.

9. A manipulator control method as claimed in claim 8, further comprising the step of calibrating two force/torque sensors disposed between the base and the means for mounting the end effector by comparing force/torque sensed by the two force/torque sensors, as computed in said computing step, with each other.

10. A manipulator control method as claimed in claim 8, further comprising the step of driving only those joints that are under respective loads that are below a predetermined level, the loads being computed in said computing step.

11. A manipulator control method as claimed in claim 8, further comprising the steps of determining which of the joints is subjected to the largest force/torque, and refraining from providing motive power to that joint, while maintaining motive power to the remaining joints.

12. A manipulator control method as claimed in claim 8, further comprising the step of changing the attitude of the manipulator when a load applied to any given region of the manipulator approaches a limit value.

13. A manipulator control method as claimed in claim 12, wherein said step of changing the attitude of the manipulator is carried out to reduce the momentum of an object impacting on an end effector mounted to said means for mounting the end effector so as to resist the impact while maintaining, at least temporarily, relative velocity between the object and the manipulator, such that stresses applied to the manipulator are reduced to below a predetermined level.

14. A manipulator control method as claimed in claim 8, wherein said computing step includes the step of reducing the momentum of an object impacting on the end effector mounted to said means for mounting the end effector, by changing the attitude of the manipulator to resist the impact while maintaining, at least temporarily, relative velocity between the object and the manipulator, such that stresses applied to the manipulator are thereby reduced to below a predetermined level.

15. A manipulator control method for controlling a manipulator having at least two degrees of freedom of movement, said manipulator including a base, a means for mounting an end effector remote from said base, and a force/torque sensor operably disposed between said base and said means for mounting an end effector, comprising the steps of:
 detecting a force/torque acting on regions of the manipulator by computing the force/torque, acting on any given point of the manipulator, from the output of said force/torque sensor; and
 counteracting the detected force/torque that exceeds a predetermined level at a region including the point of the manipulator upon which the force/torque is acting.

16. A manipulator control method as claimed in claim 15, further comprising the steps of driving a joint in a direction of alleviating the moment of the force/torque acting on said driven joint when the force/torque exceeds a predetermined value; and
 maintaining motive power to other of said joints.

17. In an orbital servicing vehicle, a method for controlling a manipulator having at least two degrees of freedom of movement, said manipulator including a base, a means for mounting an end effector remote from said base, and a force/torque sensor operably disposed between said base and said means for mounting an end effector, comprising the steps of:
 sensing a force/torque, acting on any given point of the manipulator, with said force/torque sensor;
 outputting a signal from said force/torque sensor representative of the sensed force/torque;
 computing the force/torque from the signal output from said force/torque sensor; and
 controlling the operation of the manipulator in accordance with the computed force/torque.

18. In an orbital servicing vehicle, a manipulator control method for controlling a manipulator having at least two degrees of freedom of movement, said manipulator including a base, a means for mounting an end effector remote from said base, and a force/torque sensor operably disposed between said base and said means for mounting the end effector, comprising the steps of:

detecting a force/torque acting on regions of the manipulator by computing the force/torque acting on regions of the manipulator by computing the force/torque, acting on any given point of the manipulator, from the output of said force/torque sensor; and counteracting the detected force/torque that exceeds a predetermined level at a region including the point of the manipulator upon which the force/torque is acting.

* * * * *